Patented Feb. 27, 1945

2,370,339

UNITED STATES PATENT OFFICE 2,370,339

INTERMEDIATE FOR AZO DYES

Walter V. Wirth and John V. Vaughen, Woodstown, N. J., assignors to E. I. du Pont de Nemours & Company, Wilmington, Del., a corporation of Delaware No Drawing. Application July 22, 1942, Serial No. 451,899

5 Claims. (Cl. 260—578)

This invention relates to a new process of preparing pseudocumidine which is otherwise called 2,4,5-trimethylaniline, and which is a valuable intermediate for dyes.

Pseudocumidine is a well-known and widely used intermediate for dyestuffs which has heretofore been prepared by methylating aniline or homologous hydrochlorides with methanol under pressure, or by heating trimethyl-phenyl-ammonium halides. It has been most frequently prepared from xylidine. Recently, xylidine has not been available in sufficient quantities and the supply of pseudocumidine has been insufficient to meet the demand.

It is an object of this invention to prepare pseudocumidine by a new process and by a process which is technically and economically more satisfactory than those which have preceded.

The objects of the invention are accomplished, generally speaking, by reacting dimethyl-metatoluidine with zinc chloride at elevated temperature to produce a pseudocumidine-zinc chloride complex and breaking up the complex by suitable means, for instance, by reaction with sodium hydroxide solution. Calm, Ber. 15, 1642 (1882) heated a mixture of amyl alcohol and aniline with zinc chloride and obtained amyl aniline, but reported that N-amyl-aniline would not rearrange by heating with zinc chloride. There have been other experiments of an indefinite nature along the lines of this process but, so far as we are aware, none of them were successful.

In our process meta-toluidine, which is cheap and available, is converted, by a process well-known to the prior art, to dimethyl-meta-toluidine. The dimethyl-meta-toluidine is the raw material from which the pseudocumidine is prepared.

In the following example the parts are by weight unless otherwise specified. Temperatures and conditions are illustrative, and not limitative.

Example

An agitated acid-proof vessel was charged with 594 parts of N,N-dimethyl-meta-toluidine. To this was added 650 parts of 95-97% zinc chloride. Some heat was evolved as a result of the addition, and additional heat was applied to cause the mixture to boil. Distilling dimethylmeta-toluidine was condensed and returned to the system by means of a reflux condenser. As the reaction proceeded it was necessary to increase the external heat to maintain boiling. When an inside temperature of 290-295° C. was reached, the distillation of dimethyl-meta-toluidine practically ceased. The internal evolution of heat continued, however, and the temperature rose momentarily to above 300° C. The mass was then cooled to 250° C. and poured into a pan, where it solidified to a red-brown brittle material which was easily pulverized. A quantitative yield of 1244 parts of crude pseudocumidine-zinc chloride complex was obtained. This product, which was water soluble, was analyzed for primary amine. A yield of pseudocumidine of 76-77% of the theoretical was indicated. The above product was pulverized and based with 1500 parts water and 567 parts 30% sodium hydroxide solution. The whole mixture containing the separated oil was heated to distill out water and oil, the aqueous distillate being returned to the still, and the oil being collected. A total of 490 parts oil was obtained. This analyzed 99.9% pure by total amine analysis and 93% by primary amine. This corresponds to a yield of 74-75% of the theoretical yield from dimethyl-meta-toluidine.

The amount of zinc chloride used may vary from that specified in the example, but it has been found that, when that quantity is reduced by one-half, the yield of pseudocumidine is markedly decreased and that the use of larger quantities than those specified does not improve the yield sufficiently to warrant the added expense. In place of the zinc chloride one may use HCl, zinc sulfate, cadmium chloride, cadmium sulfate and the like, but essentially anhydrous zinc chloride is preferred. Other N-substituted arylamines react in a similar way. For instance, dimethylaniline when treated according to this process produces xylidine and mono-methylaniline yields toluidine. In general the process is an efficient method of shifting an alkyl group from the nitrogen of an arylamine to the ring thereof.

By means of the invention it has been possible to obtain pseudocumidine in a 75% yield from dimethyl-meta-toluidine. The product has a relatively high purity which has permitted its use directly without further purification in the manufacture of certain dyestuffs. Previous methods for making pseudocumidine failed to produce as high a yield or as pure a product.

As many apparently widely different embodiments of this invention may be made without departing from the spirit and scope thereof, it is to be understood that we do not limit ourselves to the specific embodiments thereof except as defined in the appended claims.

We claim:

1. In a process of preparing pseudocumidine, the step which comprises heating N-N-dimethyl-meta-toluidine with zinc chloride to a temperature which at its highest point is in the neighborhood of 300° C.

2. In the process of preparing pseudocumidine, the step which comprises heating N-N-dimethyl-meta-toluidine with zinc chloride to boiling under reflux condensation, the highest temperature of the heated mixture being in the neighborhood of 300° C.

3. In the process of preparing pseudocumidine, the steps which comprise preparing a reaction mixture composed essentially of N-N-dimethyl-meta-toluidine and zinc chloride; heating the mixture under reflux condensation, the highest temperature being not more than about 300° C. until the complex of pseudocumidine and zinc chloride is formed; and then transforming said complex to pseudocumidine.

4. The process in accordance with claim 3 in which the complex is transformed to pseudocumidine by the action of a water solution of sodium hydroxide.

5. The process in accordance with claim 3 in which the reactants are present in the proportion of about 60 parts of N-N-dimethyl-meta-toluidine and about 63 parts of zinc chloride.

JOHN V. VAUGHEN.
WALTER V. WIRTH.